(12) United States Patent
Saito et al.

(10) Patent No.: US 6,722,546 B2
(45) Date of Patent: Apr. 20, 2004

(54) TAPE LOADING APPARATUS

(75) Inventors: Yoshiyuki Saito, Osaka (JP); Akio Konishi, Hyogo (JP); Koichiro Hirabayashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/147,689

(22) Filed: May 16, 2002

(65) Prior Publication Data

US 2002/0179670 A1 Dec. 5, 2002

(30) Foreign Application Priority Data

Jun. 1, 2001 (JP) ........................................ 2001-166594

(51) Int. Cl.[7] .............................. G11B 15/66; G03B 1/56
(52) U.S. Cl. ........................... 226/91; 360/85; 226/194; 242/346.2
(58) Field of Search ........................... 242/346.2, 332.5, 242/332.1; 226/91, 194

(56) References Cited

U.S. PATENT DOCUMENTS

| | | | | |
|---|---|---|---|---|
| 4,556,922 A | * | 12/1985 | Erhart | ........................ 360/85 |
| 5,206,771 A | * | 4/1993 | Katou et al. | ................... 360/71 |
| 5,395,067 A | * | 3/1995 | Kano et al. | ................... 242/344 |
| 5,640,287 A | * | 6/1997 | Hwang et al. | ................ 360/85 |
| 5,650,888 A | * | 7/1997 | Kuwajima | .................... 360/85 |
| 6,282,057 B1 | * | 8/2001 | Konishi et al. | ........ 360/130.23 |
| 6,342,988 B1 | * | 1/2002 | Matsuoka et al. | ............ 360/95 |

FOREIGN PATENT DOCUMENTS

| | | | |
|---|---|---|---|
| JP | 318356 | * | 11/1992 |
| JP | 4318361 | * | 11/1992 |
| JP | 2001-166594 A | * | 6/2001 |

* cited by examiner

*Primary Examiner*—Kathy Matecki
*Assistant Examiner*—Evan H Langdon
(74) *Attorney, Agent, or Firm*—Renner, Otto, Boisselle & Sklar, LLP

(57) ABSTRACT

A tape loading apparatus comprises a base, a roller post about which a tape is wrapped for tape loading, and a carrying member for carrying the roller post. The roller post includes a rotation shaft and a roller rotating about the rotation shaft, and a shaft engagement member is provided on the base for holding the roller post at a predetermined position, the shaft engagement member directly contacting and pressing one or both ends of the rotation shaft.

7 Claims, 1 Drawing Sheet

TAPE LOADING APPARATUS

BACKGROUND OF THE INVENTION

1. Field of the Invention

The present invention relates to a tape loading apparatus.

2. Description of the Related Art

Recently, in tape loading mechanisms for use in magnetic recording/reproduction apparatuses in which a tape is withdrawn out of a cassette and then wrapped about a rotary head cylinder, the position in the plane, and the height and inclination of a roller post provided on a carrying member are determined by pressing the carrying member to a positioning member provided on a chassis by a reference surface of the chassis and a pressing member.

Hereinafter, a conventional tape loading apparatus will be described with reference to Japanese Laid-Open Publications Nos. 4-318361 and 4-318356.

First, a conventional structure will be described with reference to Japanese Laid-Open Publication No. 4-318361. In this publication, FIG. 5 is a partial perspective view of a loading mechanism. Reference numerals 8, 10 and 11 indicate roller posts disposed on boats 14 and 15. Reference numeral 86 and 87 indicate stoppers provided on the chassis. Reference numeral 41 indicates a feed side ring gear (a take-up side loading ring is not shown in FIG. 5, see FIG. 6). Reference numerals 53 and 55 indicate, respectively, feed side and take-up side drive shafts provided on the respective feed side and take-up side ring gears. Reference numerals 17 and 18 indicate feed side and take-up side loading guides, respectively.

The feed side and take-up side loading rings are rotated by driving means. The boats 14 and 15 which are engaged with the respective feed side and take-up side loading rings are moved along the loading guides 17 and 18 to withdraw a tape out of a cassette for the purpose of tape loading. After completion of the loading, the boats 14 and 15 are pressed to the respective stoppers 86 and 87 to position the roller posts 8, 10 and 11.

The mechanism for positioning the boats 14 and 15 when the tape loading is completed will be described with reference to FIG. 15 of Japanese Patent No. 4-318361.

FIG. 15 of the above-described publication shows a mechanism for positioning the feed side boat 14. FIGS. 15(a), 15(b), 15(c) and 15(d) are a plan view, a side elevation view, a bottom plan view and a partial cross-sectional view, respectively. For the sake of clarification, the structure of each component is simplified.

In this figure, reference numeral 86 indicates a stopper provided on a chassis 1. A cone-like pressing portion 86b is provided on an upper portion of a pin 86a. Reference numeral 14a is a V-shaped groove provided at a front end of a feed side boat 14, which has a sloped portion. The feed side boat 14 is further provided with reference surfaces at the front and rear end portions thereof. The reference surfaces of the feed side boat 14 contacts and presses the reference surface of the chassis 1 when loading is completed, thereby making it possible to perform high-precision positioning.

As shown in FIGS. 5 and 15 in the above-described publication, as the feed side ring gear 38 is rotated, the feed side boat 14 is guided along the feed side loading guide 17. After completion of loading, the feed side boat 14 is in a position such that the stopper 86 contacts and presses the V-shaped groove 14a. A driving force is constantly exerted on the feed side boat 14 by a driving means (a shaking plate 45, not shown in FIGS. 5 and 15,) via a feed side drive shaft 53 in a direction indicated by P. Therefore, the stopper 86 contacts and presses the V-shaped groove 14a, so that the V-shaped groove 14a constrains the lateral position of the feed side boat 14. Meanwhile, a force is exerted to the feed side boat 14 in a direction indicated by F, so that the reference surfaces provided on the feed side boat 14 contact and press the reference surface provided on the chassis 1, thereby constraining the back-and-forth and up-and-down position of the feed side boat 14.

Next, a method for adjusting the height of the roller post will be described with reference to Japanese Laid-Open Publication No. 4-318356, since Japanese Laid-Open Publication No. 4-318361 does not describe this method.

In this publication, FIGS. 3, 4 and 5 are partial views of a conventional boat and roller post. FIG. 4 is an enlarged sectional view of FIG. 3 viewed from arrow A. In FIG. 4, reference numeral 17 indicates a roller holding member. The roller holding member 17 holds a roller 16 through which a shaft 16 is passed. Reference numeral 18 is a pipe which is press-fit into a take-up side boat 10 and into which the tip of the shaft 16 is inserted.

FIG. 5 is a partial cross-sectional view of FIG. 4 viewed in a direction indicated by arrow B. In FIG. 5, the shaft 16 is pressed by the tip of a screw 19 engaged with a screw hole 20 provided at an end of the take-up side boat 10 toward the internal surface of the pipe 18 (reference surface), so that the shaft 16 does not spontaneously rotate. In order to fix securely the shaft 16 to the reference surface n with the tip of the screw 19, the shaft 16 is extended to some extent below a point to which the tip of the screw 19 is pressed. In this case, the pipe 18 is extended a length of h below the bottom surface of the take-up side boat 10. With this reference surface n, the inclination of the roller post with respect to the reference surface of the take-up side boat 10 is determined, so that a very high degree of dimensional precision is required for the pipe 18.

As described above, in conventional mechanisms, the height of a roller post is generally adjusted by shifting the roller post up and down in the following manner. A roller holding member 17 is rotated so that a screw 19 provided at an end of the shaft 16 integrated with the roller holding member 17 is engaged with a screw provided in the pipe 18 integrated with a take-up boat 10.

However, there are the following problems with the above-described conventional structures.

As to the positioning mechanism described in the above-described Japanese Laid-Open Publication No. 4-318361, the boats 39 and 40 are positioned with respect to the chassis 1 so that the position and inclination of the roller post are determined. For this reason, the position of the roller post with respect to each boat and the inclination of the roller post with respect to the reference surface of each post need to be secured with great precision. To this end, each boat needs to have an accurate and complicated shape and is therefore very expensive.

As to the roller post height adjusting mechanism as described in the above-described Japanese Laid-Open Publication No. 4-318356, screws need to be formed in particular components, such as the roller post holding member 17 and the pipe 18. Not only the number of parts is increased, but also the cost of each component is increased.

As described in this publication, the pipe 18 is press-fit onto the take-up side boat 10. A shaft 16 of the roller post is provided inside the pipe 18 with reference to the reference surface n so that the inclination of the roller post is determined. Thus, the inclination of the roller post is determined via a number of components. Therefore, in order to secure the inclination precision of the roller post with respect to the chassis 1, the precision of each component needs to be greatly secured, resulting in an increase in the costs of the components.

If the inclination precision and position of the roller post depart from that intended with respect to the boat, the running of a tape immediately incurs problems, which may cause damage in the tape. As described above, in the conventional loading mechanism, the number of components is large and a high degree of precision is required for each component. Thus, cost reduction of the mechanism is prevented and it is difficult to achieve quality of the tape loading apparatus.

SUMMARY OF THE INVENTION

According to one aspect of the present invention, a tape loading apparatus comprises a base, a roller post about which a tape is wrapped for tape loading, and a carrying member for carrying the roller post. The roller post includes a rotation shaft and a roller rotating about the rotation shaft, and a shaft engagement member is provided on the base for holding the roller post at a predetermined position, the shaft engagement member directly contacting and pressing one or both ends of the rotation shaft. Therefore, a simple mechanism for positioning a roller post can be made of inexpensive components, and the number of components can be reduced, thereby providing an inexpensive and highly reliable tape loading apparatus.

In one embodiment of this invention, at least one V-shaped cut is provided in the shaft engagement member, and the at least one V-shaped cut engage a respective end of the rotation shaft. Therefore, the roller post can be fixed at a predetermined position with great precision. A tape loading apparatus can be easily obtained using more simple and inexpensive components.

According to another aspect of the present invention, a tape loading apparatus comprises a roller post about which a tape is wrapped for tape loading, a rotation shaft about which the roller post is rotatably secured, the rotation shaft having a lower portion extending from a lower end of the roller post and an upper portion extending from an upper end of the roller post, a carrier member to which the lower portion of the rotation shaft is secured, a pushing mechanism for pushing on the carrier member to move the carrier member generally horizontally for tape loading, a lower member extending toward the roller post, the lower member including a lower engagement surface for securely engaging the lower portion of the rotation shaft at a lower portion fixed horizontal position as a result of force exerted by the pushing mechanism, an upper member extending toward the roller post, the upper member including an upper engagement surface for securely engaging the upper portion of the rotation shaft at an upper portion fixed horizontal position as a result of the force exerted by the pushing mechanism, and a ceiling member including a ceiling engagement surface for securely engaging a tip of the upper portion of the rotation shaft at an upper ceiling fixed vertical position as a result of the force exerted by the pushing mechanism.

In one embodiment of this invention, the lower member and the upper member each include a V-shaped cut to form the lower and upper engagement surfaces.

In one embodiment of this invention, the lower member, upper member and ceiling member are formed by a single integral structure.

In one embodiment of this invention, the lower member, upper member and ceiling member are generally parallel to one another.

Thus, the invention described herein makes possible the advantages of providing a tape loading apparatus having a loading mechanism comprising a small number of simple components. Cost can thereby be reduced while a high level of performance is achieved.

These and other advantages of the present invention will become apparent to those skilled in the art upon reading and understanding the following detailed description with reference to the accompanying figures.

DESCRIPTION OF THE PREFERRED EMBODIMENTS

EXAMPLE

A tape loading apparatus according to an example of the present invention will be described with reference to FIGS. 1A to 1C.

Figure 1A:
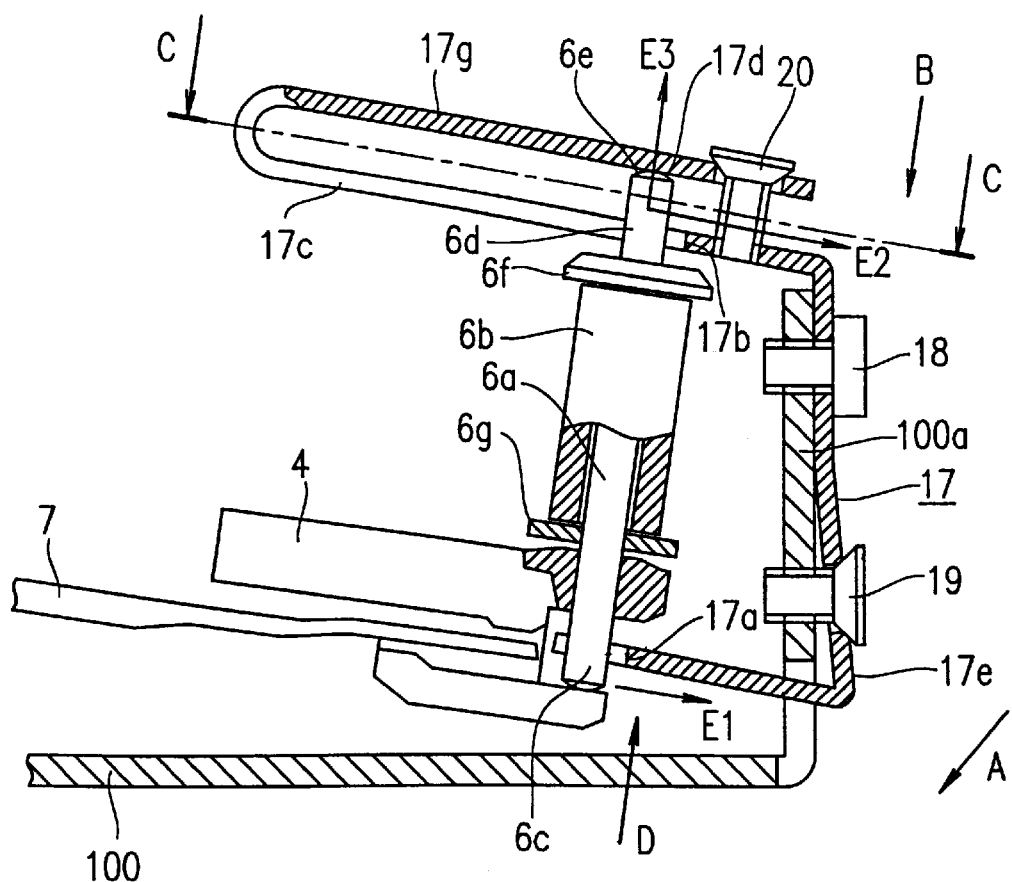
FIG. 1A is a side view showing a mechanism for positioning a roller post at a place for tape loading in accordance with the present invention.

FIG. 1A is a side view showing a mechanism for positioning a roller post at a place for tape loading. In FIG. 1A, reference numeral 4 indicates a boat for shifting a roller post 6b. A rotation shaft 6a of the roller post 6b is press-fit into the boat 4. In the roller post 6b, reference numeral 6d indicates a portion of the rotation shaft 6a protruding above an upper flange 6f of the roller post 6b. Reference numeral 6a indicates a portion of the rotation shaft 6a protruding below the lower flange 6g of the roller post 6b. Therefore, the portions 6a and 6d are the respective upper and lower portions of the rotation shaft 6a.

Reference numeral 7 indicates a guide member of the boat 4 in loading. Reference numeral 100 indicates a chassis. A roller post positioning member 17 (hereinafter referred to as a V-shaped stopper) is attached to a vertical wall 100a of the chassis 100 with a screw 18. The V-shaped stopper 17 comprises a lower V portion 17a which contacts and presses the lower portion 6a of the roller post 6b, an upper V portion 17b which contacts and presses the upper portion 6d of the roller post 6b, and a ceiling portion 17d which contacts and presses the tip 6e of the roller post 6b, so that the V-shaped stopper 17 positions the roller post 6b. FIG. 1B is a view showing the upper portion of the V-shaped stopper 17, taken along line C—C in FIG. 1A. FIG. 1C is a view showing the lower portion of the V-shaped stopper 17, viewed in a direction indicated by arrow D. Portions 17g and 17e are resilient, and are bent in the respective directions of arrows A and B, to which adjusting screws 19 and 20 are attached. By rotating the screw 19, the position of the lower V portion 17a is changed. By rotating the screw 20, the ceiling portion 17g and the height of a point 17d which contacts the tip 6e of the roller post 6b can be adjusted.

The operation of the thus-constructed tape loading apparatus will be described with reference to FIGS. 1A to 1c.

Figure 1B:
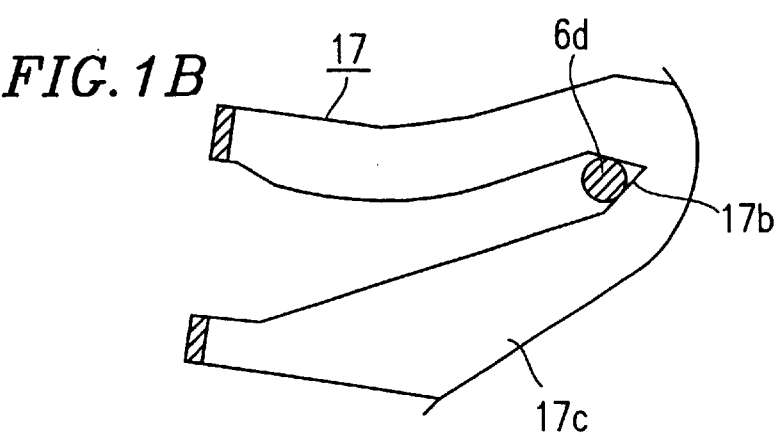
FIG. 1B is a view showing the upper portion of the V-shaped stopper, taken along line C—C in FIG. 1A.
Figure 1C:
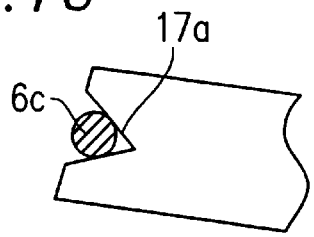
FIG. 1C is a view showing the lower portion of the V-shaped stopper 17, viewed in a direction indicated by arrow D in FIG. 1A.

In FIGS. 1A to 1C, the boat 4 is pushed substantially in a direction indicated by arrow E1 by a driving means (not shown). As a result, the lower portion 6c of the roller post 6b contacts and presses the lower V portion 17a. The upper portion 6d of the roller post 6b contacts and presses the upper V portion 17b. Therefore, the tip 6e contacts and presses the ceiling portion 17d. Forces are exerted on the roller post 6b in directions indicated by arrows E1, E2 and E3 so that the roller post 6b is positioned at a predetermined angle and height.

In this case, as described above, the V-shaped stopper 17 is adjusted in the directions of arrows A and E1, E2 and E3 so that each portion is held at an ideal position by the screws 19 and 20 with respect to the chassis 100. The rotation shaft 6a of the roller post 6b is directly pushed and attached to the upper and lower V portions 17a and 17b and the ceiling portion 17d without other members therebetween. Therefore, the roller post 6b is positioned with great precision. As shown in FIG. 1A, when the position of the boat 4 is established for tape loading, the boat 4 does not contact and press any of the chassis 100, the guide member 7 and the V-shaped stopper 17. Thus, the boat 4 does not affect the precision of positioning the roller post 6b. In other words, the position and inclination of the boat 4 do not affect the position precision of the roller post 6b, unlike conventional technologies. Therefore, a high degree of precision with respect to the dimensions of the boat 4 and the position and inclination of the roller post 4b with respect to the boat 4 are not required, and substantially ideal tape loading can be achieved. As a result, since a high degree of precision is not required for each component, the cost of each component can be reduced while the precision of positioning each component can be easily obtained. Therefore, a highly reliable tape loading apparatus can be obtained.

Further, in the example, the height of the roller post 6b is adjusted by adjusting the height of the ceiling portion 17d which the tip 6e of the roller post 6b contacts and presses. Therefore, as described in the DESCRIPTION IN THE RELATED ART, the screw provided in the roller post, the pipe press-fit into the boat, the screw provided in the pipe, and the like are not required. This makes it possible to reduce the number of components and eliminate expensive components.

As described above, according to the example of the present invention, the boat 4 carrying the roller post 6b is pushed from the rear to cause the rotation shaft 6a of the roller post 6b to contact directly the positioning members so as to position the roller post 6b. Therefore, a simple mechanism for positioning a roller post can be made of inexpensive components, and the number of components can be reduced, thereby providing an inexpensive and highly reliable tape loading apparatus.

Further, due to the V-shaped cuts of the V-shaped stopper 17 which contact and press the respective upper and lower portions of the roller post 6b to position the roller post 6b, the roller post 6b can be fixed at a predetermined position. Therefore, a tape loading apparatus can be easily obtained using simple and inexpensive components.

In the example, the V-shaped stopper 17 which is engaged with the rotation shaft 6a is directly attached to the chassis 1. Even if the V-shaped stopper 17 is attached to the chassis 1 via a third member, the same effect as that of the present invention can be obtained. Further, even if the V-shaped stopper 17 is integrated as part of the chassis 1, the same effect as that of the present invention can be obtained.

As described above, according to the present invention, an engagement member carried by a base is used to position directly one or both ends of the rotation shafts of a roller post, thereby making it possible to provide an inexpensive and high-performance tape loading apparatus having a positioning mechanism comprising simple components.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tape loading apparatus, comprising:
   a base;
   a roller post about which a tape is wrapped for tape loading; and
   a carrying member for carrying the roller post,
   wherein the roller post includes a rotation shaft and a roller rotating about the rotation shaft, and a shaft engagement member is provided on the base for holding the roller post at a predetermined position, the shaft engagement member directly contacting and pressing one or both ends of the rotation shaft, and
   the carrying member does not contact and press the base or the shaft engagement member when positioned for tape loading.

2. A tape loading apparatus according to claim 1, wherein at least one V-shaped cut is provided in the shaft engagement member, and the at least one V-shaped cut engage a respective end of the rotation shaft.

3. A tape loading apparatus, comprising:
   a roller post about which a tape is wrapped for tape loading;
   a rotation shaft about which the roller post is rotatably secured, the rotation shaft having a lower portion extending from a lower end of the roller post and an upper portion extending from an upper end of the roller post;
   a carrier member to which the lower portion of the rotation shaft is secured;
   a pushing mechanism for pushing on the carrier member to move the carrier member generally horizontally for tape loading;
   a lower member extending toward the roller post, the lower member including a lower engagement surface for securely engaging the lower portion of the rotation shaft at a lower portion fixed horizontal position as a result of force exerted by the pushing mechanism;
   an upper member extending toward the roller post, the upper member including an upper engagement surface for securely engaging the upper portion of the rotation shaft at an upper portion fixed horizontal position as a result of the force exerted by the pushing mechanism; and
   a ceiling member including a ceiling engagement surface for securely engaging a tip of the upper portion of the rotation shaft at an upper ceiling fixed vertical position as a result of the force exerted by the pushing mechanism,
   wherein the carrying member does not contact and press the base or the upper, lower or ceiling member when positioned for tape loading.

4. A tape loading apparatus according to claim 3, wherein the lower member and the upper member each include a V-shaped cut to form the lower and upper engagement surfaces.

5. A tape loading apparatus according to claim 3, wherein the lower member, upper member and ceiling member are formed by a single integral structure.

6. A tape loading apparatus according to claim 3, wherein the lower member, upper member and ceiling member are generally parallel to one another.

7. A tape loading apparatus, comprising:
- a roller post about which a tape is wrapped for tape loading;
- a rotation shaft about which the roller post is rotatably secured, the rotation shaft having a lower portion extending from a lower end of the roller post and an upper portion extending from an upper end of the roller post;
- a carrier member to which the lower portion of the rotation shaft is secured;
- a pushing mechanism for pushing on the carrier member to move the carrier member generally horizontally for tape loading;
- a lower member extending toward the roller post, the lower member including a lower engagement surface for securely engaging the lower portion of the rotation shaft at a lower portion fixed horizontal position as a result of force exerted by the pushing mechanism;
- an upper member extending toward the roller post, the upper member including an upper engagement surface for securely engaging the upper portion of the rotation shaft at an upper portion fixed horizontal position as a result of the force exerted by the pushing mechanism; and
- a ceiling member including a ceiling engagement surface for securely engaging a tip of the upper portion of the rotation shaft at an upper ceiling fixed vertical position as a result of the force exerted by the pushing mechanism,
- wherein the lower member, upper member and ceiling member are formed by a single integral structure.

* * * * *